US012559122B2

(12) United States Patent
John

(10) Patent No.: US 12,559,122 B2
(45) Date of Patent: Feb. 24, 2026

(54) STEERING INPUT WITH LIGHT SOURCE

(71) Applicant: FCA US LLC, Auburn Hills, MI (US)

(72) Inventor: Rijil John, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 156 days.

(21) Appl. No.: 18/310,149

(22) Filed: May 1, 2023

(65) Prior Publication Data

US 2024/0367666 A1    Nov. 7, 2024

(51) Int. Cl.
  *B60W 50/14* (2020.01)
  *B60W 50/08* (2020.01)
(52) U.S. Cl.
  CPC .......... *B60W 50/14* (2013.01); *B60W 50/082* (2013.01); *B60W 2050/146* (2013.01)
(58) Field of Classification Search
  CPC ............... B60W 50/14; B60W 50/082; B60W 2050/146; B62D 1/046; B62D 1/10
  See application file for complete search history.

(56) References Cited

U.S. PATENT DOCUMENTS

| | | | | |
|---|---|---|---|---|
| 6,955,376 | B1 * | 10/2005 | Labrie ................. | B29C 45/1704 |
| | | | | 280/732 |
| 10,730,431 | B2 * | 8/2020 | Marc ........................ | B60Q 3/80 |
| 11,383,639 | B1 * | 7/2022 | Kwon ....................... | B60Q 3/64 |
| 11,780,399 | B2 * | 10/2023 | Hatfield ................ | B60R 21/215 |
| | | | | 280/728.3 |
| 2006/0125217 | A1 * | 6/2006 | Nakamura ............ | B60R 21/203 |
| | | | | 280/731 |
| 2009/0121459 | A1 * | 5/2009 | Bostick .................... | B60Q 3/16 |
| | | | | 280/728.3 |
| 2014/0111324 | A1 * | 4/2014 | Lisseman ............... | B60K 35/00 |
| | | | | 74/552 |
| 2019/0210520 | A1 * | 7/2019 | Marc ........................ | B60Q 3/80 |
| 2019/0351860 | A1 * | 11/2019 | Ohki ........................ | B60Q 3/20 |
| 2019/0373728 | A1 * | 12/2019 | Hengel .................... | H05K 1/18 |
| 2022/0063518 | A1 * | 3/2022 | Kim ........................ | G09F 21/049 |
| 2023/0029371 | A1 * | 1/2023 | Hatfield ................ | B60R 21/215 |
| 2025/0033476 | A1 * | 1/2025 | Pirkey ................... | B60K 35/10 |

OTHER PUBLICATIONS

Sullivan; Patrick; GMC Pressroom; GMC Sierra to Feature Super Cruise Hands-Fee Driver Assistance Technology, https://media.gm.com/media/us/en/gmc/news.detail.html/content/Pages/news/us/en/2020/dec/1209-sierra.html.

* cited by examiner

*Primary Examiner* — Jason Holloway
*Assistant Examiner* — Madison B Emmett
(74) *Attorney, Agent, or Firm* — Jeremy J. Klobucar

(57) ABSTRACT

A steering input includes a body having a hub adapted to be connected to a steering column, a spoke extending radially from the hub and a rim coupled to the spoke, wherein the hub includes a cavity and a cover received over the cavity. And the steering input includes a light source received within the cavity and arranged to emit light from the cavity, the light source having a first output and a second output and being selectively driven to provide either the first output or the second output.

20 Claims, 4 Drawing Sheets

STEERING INPUT WITH LIGHT SOURCE

FIELD

The present disclosure relates to a steering input, such as a steering wheel, with a light source.

BACKGROUND

Vehicles include steering wheels and may include an at least somewhat autonomous control system that controls some operation of the vehicle, for example, one or more of steering, acceleration and braking. The interaction between the autonomous control system and the driver of the vehicle can be important to ensure the driver knows when driver control of the vehicle is needed and when the control system is operating. Complicated displays or displays provided outside of the driver's field of view can be distracting to the driver and ineffective at informing the driver about the state of the control system. Further, these displays increase the cost of the vehicle and the complexity of the system.

SUMMARY

In at least some implementations, a steering input includes a body having a hub adapted to be connected to a steering column, a spoke extending radially from the hub and a rim coupled to the spoke, wherein the hub includes a cavity and a cover received over the cavity. And the steering input includes a light source arranged to emit light through a portion of the cover, the light source having a first output and a second output and being selectively driven to provide either the first output or the second output.

In at least some implementations, a switch is received within the cavity and coupled to the cover, wherein movement of the cover relative to the hub changes the state of the switch.

In at least some implementations, the light source is adapted to be coupled to a vehicle control system that controls operation of the light source, and wherein the light source provides the first output when an assisted driving system is enabled and actively controlling at least one vehicle drive control, and the light source provides the second output when the assisted driving system is enabled but not actively controlling at least one vehicle drive control. In at least some implementations, the light source has an off state in which no light is emitted from the light source, and the off state relates to a condition in which the assisted driving system is not enabled.

In at least some implementations, the cover includes a first portion through which light from the light source is transmitted.

In at least some implementations, the light source is carried by an airbag module that is received at least partially within the cavity. In at least some implementations, the cover is part of the airbag module and the light source is received in the airbag module beneath the cover. The cover may include a central portion defined at least in part by a seam of the cover that is constructed to separate upon deployment of an airbag, and the light source is received on a rear side of the central portion. The cover may include a fixed portion that defines part of the central portion and which does not separate upon deployment of the airbag, and wires via which electricity is provided to the light source may be arranged across the fixed portion.

In at least some implementations, a vehicle includes a steering column, a steering input, a light source and a vehicle control system. The steering input has a body with a hub connected to the steering column, a spoke extending radially from the hub, and a rim coupled to the spoke, and the hub includes a cavity and a cover received over the cavity. The light source is arranged to emit light through a portion of the cover, the light source has a first output and a second output and being selectively driven to provide either the first output or the second output. The vehicle control system has an assisted driving system that is operable to control movement of the steering input to control steering of the vehicle. The vehicle control system is coupled to the light source to control operation of the light source, and the light source provides the first output when the assisted driving system is in a first state and the light source provides the second output when the assisted driving system is in a second state.

In at least some implementations, the first state is a state in which the assisted driving system is enabled and is actively controlling the vehicle steering, and the second state is a state in which the assisted driving system is enabled but is not actively controlling the vehicle steering.

In at least some implementations, the light source is coupled by one or more wires to the vehicle control system, and the one or more wires extend into the cavity through the hub. In at least some implementations, the one or more wires extend within the steering column.

In at least some implementations, at least part of the cover is movable relative to the hub, and movement of said at least part of the cover closes a switch contained within the cavity, and the switch is coupled to a vehicle horn to provide an audible output from the horn when the switch is closed.

In at least some implementations, the first output is light of a first color and the second output is light of a second color that is different from the first color. In at least some implementations, the light source has an off state in which no light is emitted from the light source. In at least some implementations, the light source has a third output that is different from both the first output and the second output.

In at least some implementations, a portion of the cover includes a light transmissive portion through which light emitted from the light source is visible. In at least some implementations, the light transmissive section is in the form of a logo of the brand of the vehicle, wherein the appearance of the logo changes when the light source is emitting light.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
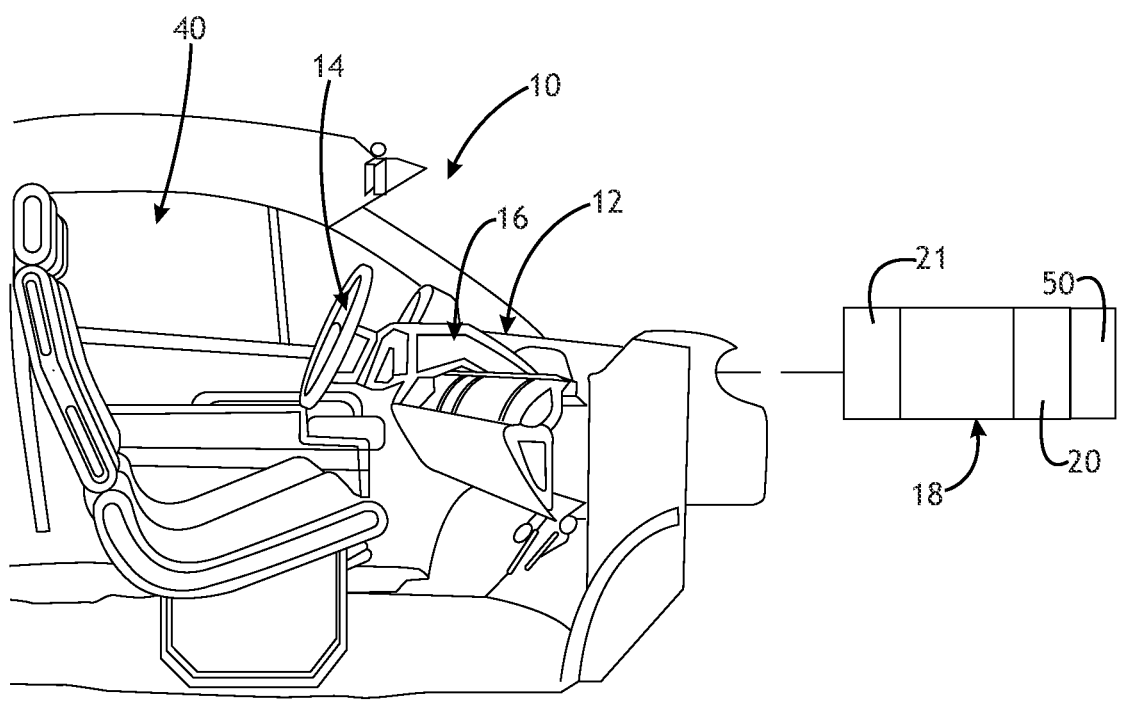
FIG. 1 is a fragmentary view of a vehicle including a steering wheel.

Referring in more detail to the drawings, FIG. 1 illustrates part of a vehicle 10 including a steering system 12 that is manipulated to control the direction of the vehicle travel. The steering system 12 includes a steering input 14 mounted to a steering column 16 for rotation, where rotation of the steering wheel 14 is transmitted to vehicle wheels to change the angle or direction of the wheels and permit steering of the vehicle 10. The steering system 12 may include direct mechanical couplings for direct mechanical manipulation of the steering angle of the vehicle, or it may be a steer by wire system wherein steering input movement is transmitted to a motor that causes a change in the steering angle of the vehicle.

The vehicle 10 also includes a control system 18 including one or more controllers, and an at least somewhat autonomous assisted driving system 20 that may be part of the control system 18 and that is selectively activated to permit computer control of at least one vehicle drive system 21 such as steering, acceleration and/or braking of the vehicle 10 over at least some roads or in at least certain operating conditions. When not activated, the vehicle drive systems 21 may be operated by a driver.

Figure 2:
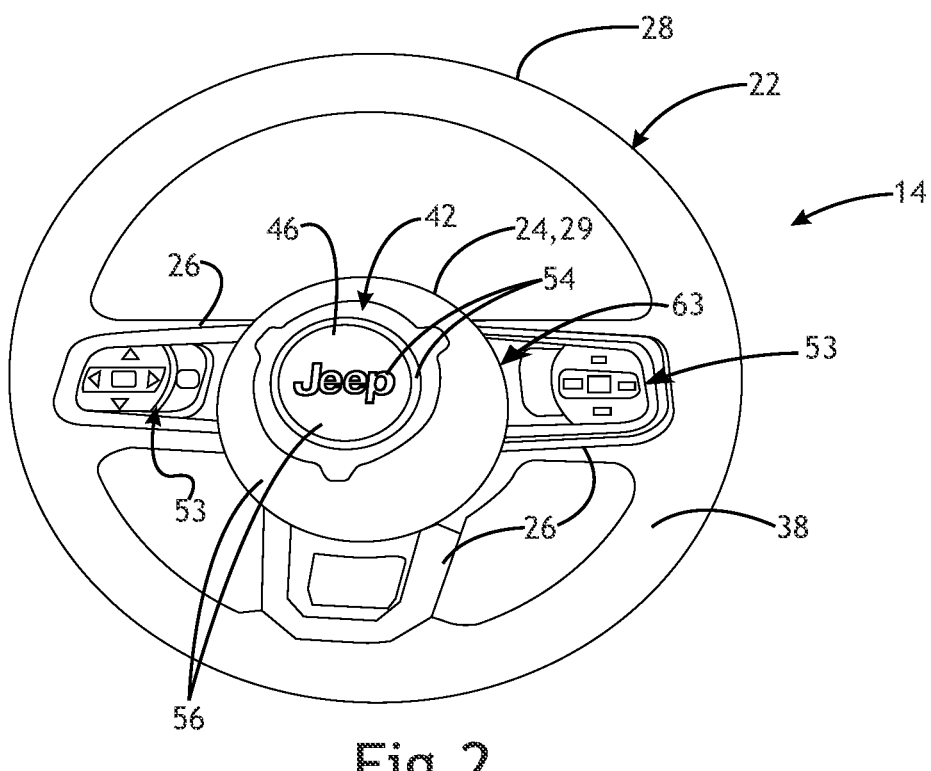
FIG. 2 is a top view of the steering wheel.
Figures 3, 4:
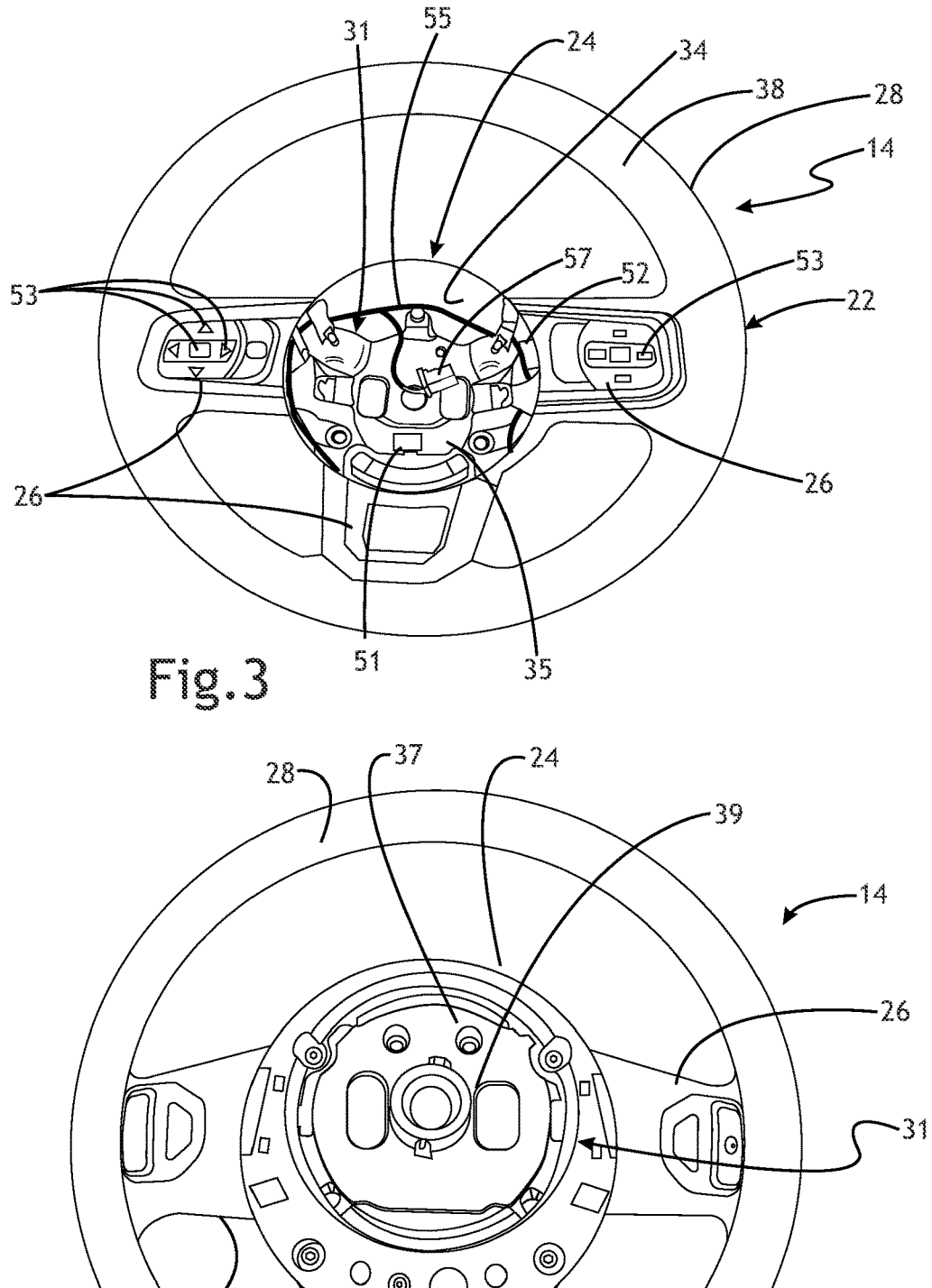
FIG. 3 is a top view of the steering wheel with an air bag module removed.
FIG. 4 is a bottom view of the steering wheel showing a bracket by which the steering wheel is mounted to a steering shaft.

The steering input may be in the form of a steering wheel 14 but need not be circular and can have any desired shape or form. As shown in FIGS. 2-4, the steering wheel 14 has a body 22 with a hub 24, one or more spokes 26 and a rim 28. The spoke or spokes 26 may extend outwardly from hub 24 to the rim 28, and the rim 28 may provide one or more locations by which a user may handle the steering wheel 14 to rotate it (noting that some users may also or instead use part of a spoke to rotate the steering input).

Figure 5:
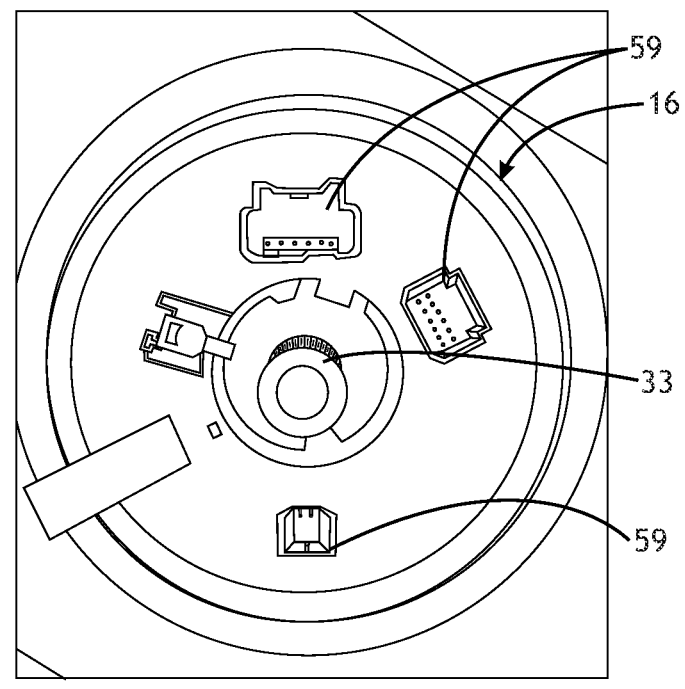
FIG. 5 is a top view showing a steering shaft and mount for the steering wheel.

The hub 24 may define a base of the body 22 and may include an airbag module 29 received within a cavity 34 defined by the hub 24. As shown in FIGS. 3 and 4, a lower end of the cavity 34 may be defined by a mounting bracket 31 by which the steering wheel 14 can be connected to a steering shaft 33 (FIG. 5) in the steering column 16. In more detail, and with reference to FIG. 3, a front surface 35 of the mounting bracket may define a lower end of the cavity and the airbag module 29 (FIGS. 2, 6 and 7) may be received within the cavity 34 and connected to the mounting bracket 31. A rear surface 37 of the mounting bracket 31 is shown in FIG. 4. The rear surface 37 includes a keyed opening 39 adapted to be connected to the steering shaft 33 so that the steering wheel 14 and steering shaft 33 rotate together.

Figure 6:
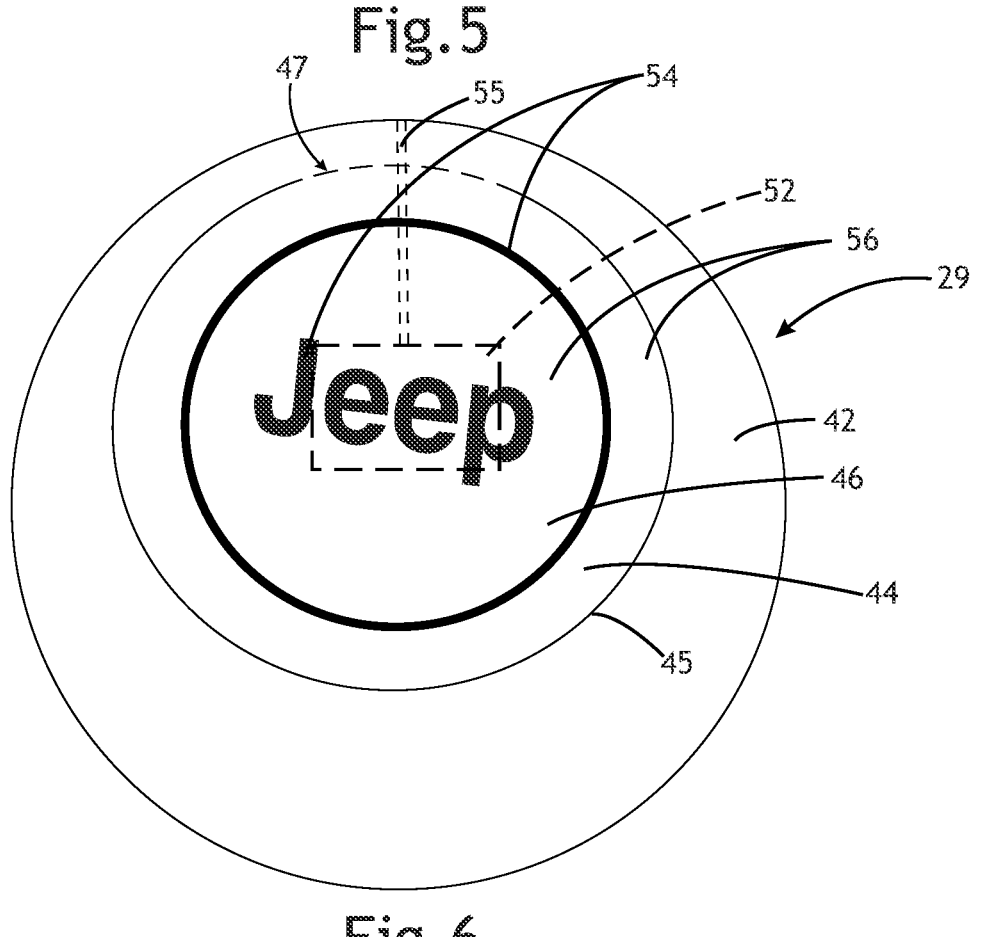
FIG. 6 is a top view of the air bag module.

In FIG. 2, the airbag module 29 is shown in place on the steering wheel 14. In FIG. 3, the steering wheel 14 is shown without the airbag module 29, and in FIGS. 6 and 7, the airbag module 29 is shown by itself, separate from the steering wheel 14. As best shown in FIGS. 2 and 6, the airbag module 29 may include an outer cover 42 that is exposed within the vehicle, facing a driver of the vehicle. The cover 42 may include a central portion 44 defined within a separation seam 45 or line about which the cover opens upon deployment of an airbag from the airbag module 29. The central portion 44 may include or be defined in part by a fixed portion 47, shown in dashed lines in FIG. 6, that may be aligned with the seam 45, that remains connected to the cover 42 when an airbag deploys, and that may define a living hinge portion of the cover 42 about which the central portion 44 moves when an airbag deploys. The central portion 45 may define or include a horn pad 46 that is coupled to a vehicle horn 50 (FIG. 1), in known manner, so that movement of the horn pad 46 can actuate the vehicle horn 50 by changing the state of a switch 51 (FIG. 3) located within the cavity 34 and connected to the horn 50. The airbag module 29 may be constructed and arranged in known manner and may be fixed to the mounting bracket 31, such as by fasteners.

As shown in FIGS. 2 and 3, certain switches, buttons or other control features 53 may be provided on the spoke(s) 26 or rim 28 of the steering wheel 14. These features permit control of certain portions of a human machine interface, to permit user control of a sound system, information displayed on a dashboard or instrument panel, and a vehicle system like a speed control system commonly called cruise control, by way of examples. Wiring for these control features may pass from the steering column 16 into the hub 24 and from the hub 24 to the spokes 26 and/or rim 28. In this regard, as shown in FIG. 3, one or more wiring harnesses 55 or wires may be provided in the cavity, and may extend through one or more openings in the mounting bracket 31, and may include one or more electrical connectors 57 connectable to mating electrical connectors 59, such as those shown in FIG. 5, adjacent the steering shaft 33 within the steering column 16. Further, as shown in FIG. 7, the airbag module 29 may include an electrical connector 61 by which electrical power is supplied to the airbag module 29 via a circuit including at least one of the connectors 61.

In at least some implementations, a light source 52 (shown diagrammatically in FIGS. 2 and 6) is provided in the area of the hub 24 to emit light that is detectable or visible from the exterior of the steering wheel 14, particularly from someone viewing the front side 38 of the steering wheel 14 from a seat adjacent to the steering wheel 14. The light source 52 may be coupled to a wiring harness 55 or other wire(s) within the cavity 34 and/or within the airbag module 29, and may be coupled to the control system 18 to permit control of the output of the light source 52. The light source 52 may be any device that can emit light into the cavity 34, including but not limited to an LED or LED array having multiple outputs including multiple different colors of light, and/or light intensities. The light from the light source 52 may be visible through at least part of the cover 42 or through an open space 63 (FIG. 2) or gap between the cover 42 and hub 24, or both.

In at least some implementations, the light source 52 may be carried by or connected to the airbag module 29, such as beneath an outer surface of the cover 42, in the area of the central portion 44 or the horn cover 46, as diagrammatically shown in FIGS. 2 and 6. In FIG. 6, a wiring harness or wires 55, via which electricity is provided to the light source 52, extend beneath the cover 42 of the airbag module 29, through the area that defines the fixed portion 47, and to the light source 52 mounted to the rear side of the central portion 44. So arranged, the wire(s) 55 and light source 52 can remain connected to the cover 42 and are not in the way of and do not interfere with a deploying airbag that expands outwardly through the seam 45, and these components 52, 55 are not displaced from the airbag module 29 by a deploying airbag.

Figure 7:
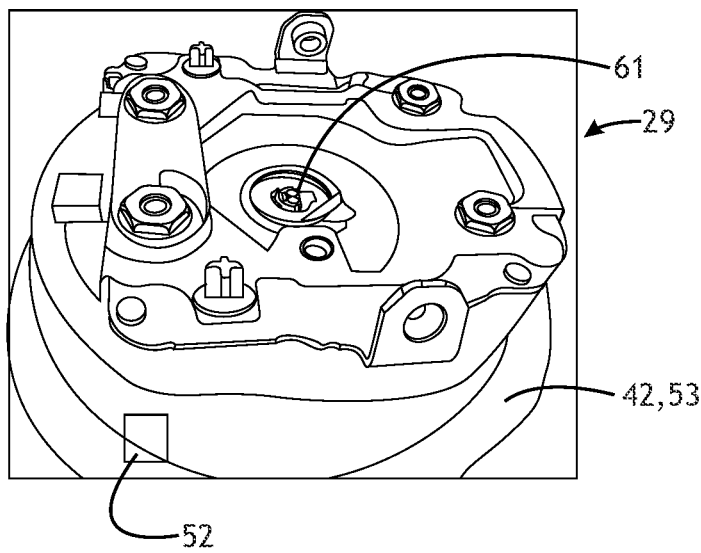
FIG. 7 is a bottom view of the air bag module.

In FIG. 7 the light source 52 is diagrammatically shown on a rear side of an outwardly extending flange 53 of the cover 42 of the airbag module, in an area of the flange 53 that overlies part of the hub 24, when the airbag module 29 is coupled to the steering wheel 14. Light may be directed into a corresponding opening in the flange and into the airbag module so that light is projected outwardly from the airbag module as noted herein. In another implementation, as diagrammatically shown in FIG. 3, the light source 52 is coupled to the hub 24 and arranged to direct light through an opening in the airbag module 29 or around part of the airbag module, or otherwise to the interior of the cover and at the back or rear side of the horn cover 46. Electrical power to the light source 52 can be provided via wires 55 and a connector 59 (FIG. 5) from the steering column 16 and/or a connector 61 (FIG. 7) of the airbag module 29. Further, multiple light sources may be provided and located as desired to provide visible light from the area of the hub 24 as set forth herein.

In at least some implementations, the steering wheel 14, and in particular the cover 42 and/or the hub 24, may include one or more light transmissive portions 54 (FIGS. 2 and 6), e.g. translucent or at least somewhat transparent sections, through which light may be transmitted. The light transmissive portions 54 may be decorative and may part of a design for the cover 42, which may include a logo or other design. In the example shown in FIGS. 2 and 6, the light transmissive portions 54 include all or part of the letters in the Jeep® logo, and/or the light transmissive portion 54 may include all or part of a circle surround the letters and near a periphery of the cover 42. Of course, other designs and arrangements of light transmissive portion(s) may be used, as desired. Further, different portions of the cover 42 may include different light transmissive portions 54 that are used to convey information to a driver or passenger. For example, symbols, letters or words may be formed by the transmissive sections 54, such as "on" or "off" or "active" or the like, to indicate different states of a vehicle system, as set forth in more detail below. As noted above, the light transmissive portions 54 may be defined entirely or in part by open space through part of the cover 42 or between the cover 42 and hub 24 of the steering wheel 14.

In at least some implementations, the light source 52 is capable of providing different outputs to signify different conditions. For example, in the context of an autonomous or assisted driving system 20 in the vehicle, the light source 52 can be used to indicate different states of the assisted driving system 20. For example, the assisted driving system 20 may have a first state in which the system is powered but is not actively controlling a vehicle drive system 21 (e.g. steering, acceleration or braking), a second state in which the system is powered on and is activated to control at least one vehicle drive system 21, and the system may have a third state in which the system is not powered and in which the system is not ready for activation (e.g. the system is off). Of course, the system may have other states as well, for example, a fourth state in which the system is actively controlling a vehicle drive system 21, but wherein a driver has temporarily taken control of one or more vehicle drive systems 21 (e.g. the driver changes the steering angle to change lanes or make a different maneuver).

In at least some implementations, the light source 52 has a variable output and can provide a different output to correspond to multiple modes or states of the assisted driving system 20. By way of one example, the light source 52 may have a different output for each mode or state of operation of the assisted driving system 20.

In the example system noted above, in the first state, the assisted driving system 20 is active but not actively controlling one or more vehicle drive systems 21 and the light source 52 may provide a first output including light of a first color. The first color may be red to provide a warning or indication to the driver that the assisted driving system 20 is not controlling vehicle operation. In the second state of the assisted driving system 20, where the system is actively controlling one or more vehicle drive systems 21, the light source 52 may provide a second output including light of a second color. The second color may be green to indicated that the system is active and functioning correctly.

In the third state, in which the system is not powered or active, and in which the system is not ready for activation by a driver, the light source 52 may provide a third output including light of a third color, or no light at all. The light of a third color may be, for example, white light or a user chosen color that is not the same as the colors used to indicate a state of the assisted driving system 20. The third color or output may be provided for decoration, such as to illuminate a logo, words or other indicia on the steering wheel 14, without indicating operation of the assisted driving system 20.

In the fourth state of the assisted driving system 20, in which the system is actively controlling a vehicle drive system 21 but a driver has temporarily taken control of one or more vehicle drive systems 21, the light source 52 may provide a fourth output of a different color than used in the other states of operation of the assisted drive system 21. The fourth color may be blue, or a user chosen color. The fourth output may be continuous light, or it may be a blinking or flashing light output to denote the temporary nature of the fourth state of the assisted driving system 20 which may occur, in at least some implementations, for as long as the user interferes with or takes control of a vehicle drive system 21, but which ends to return to system control of the vehicle drive system(s) when user control ceases and until the assisted driving system 20 is again in control of the one or more vehicle drive systems 21.

While four states of operation and four outputs from the light source 52 are described, any number of states and outputs may be used, as desired. The light source 52 may emit light that is visible through part of the steering wheel 14, for example the cover 42, and in particular one or more light transmissive sections 54 of the steering wheel 14. The light transmissive sections 54 of the steering wheel 14 may include a logo, one or more letters or words, or other design formed of a thinner section of the cover 42, or of a different material.

For example, the cover 42 may include a first portion 56 having a first level of light transmission and which may be of a first color, and the light transmissive section(s) 54 which have a second level of light transmission that is greater than the first level (e.g. light is more visible through the second portion than the first portion) and which may be of a second color that is different than the first color. The different colors, if used, may enable the design on the cover 42 to be easily visible/determinable even without the light source 52 emitting light within the cavity 34. In at least some implementations, no light from the light source 52 is visible through the first portion (i.e. it is opaque), and light emitted from the light source 52 is visible through the second portion (i.e. it is light transmissive, such as translucent or transparent at least to some extent).

In at least some implementations, the light transmissive portions 54 may be defined by an absence of material, that is, an open space like a gap and/or an opening. The gap or opening may be provided through the cover 42 (e.g. through the front and rear surfaces and open into the cavity 34, or at an interface between part of the cover 42 and the hub 24 of the steering wheel 14. In this way, light may project through the open space and may be visible to a person viewing the steering wheel 14 or to whom the steering wheel 14 is within their field of vision.

The light source may be conveniently provided within a cavity of the steering wheel, in a portion of the steering wheel that is within a field of vision of a driver of the vehicle. The cavity may include wires and suitable connections for the light source without requiring additional wires or connectors beyond those used for other electrically operated features of the steering wheel. Further, the light source may provide information to a driver of the vehicle, where "driver" is intended to mean someone able to operate the vehicle drive controls whether or not they are doing so at any particular time, or whether an assisted driving system is controlling the vehicle drive systems. The information provided to the driver may indicate the state or mode of operation of the assisted driving system so that the driver is informed when the system is active and when the driver needs to control one or more of the vehicle drive systems. The information may be provided via one or more decorative, light transmissive sections of the steering wheel, such as via a logo formed in a cover of the steering wheel. The connection and control of the light source may be conveniently accomplished within the steering wheel, and near a steering column or other mount interface for the steering wheel. Existing vehicle controllers/control system may be used, or a dedicated controller/control system may be used, as desired.

What is claimed is:

1. A steering input, comprising:
a body having a hub adapted to be connected to a steering column, a spoke extending radially from the hub and a rim coupled to the spoke, wherein the hub includes a cavity and a cover received over the cavity;
a light source arranged to emit light through a portion of the cover, the light source having a first output and a second output and being selectively driven to provide either the first output or the second output; and
an airbag module received within the cavity, wherein the cover is part of the airbag module, and the cover includes a central portion defined at least in part by a seam of the cover that is located inward of a periphery of the cover and is constructed to separate upon deployment of an airbag of the airbag module such that the airbag extends through the cover when the airbag deploys, and wherein the light source is received behind the central portion and the cover includes a fixed portion that is connected to the central portion by a living hinge portion of the cover and which overlaps the airbag and which does not separate upon deployment of the airbag, and wherein wires via which electricity is provided to the light source are arranged across the fixed portion.

2. The steering input of claim 1 wherein the light source is adapted to be coupled to a vehicle control system that controls operation of the light source, and wherein the light source provides the first output when an assisted driving system is enabled and actively controlling at least one vehicle drive control, and the light source provides the second output when the assisted driving system is enabled but not actively controlling at least one vehicle drive control.

3. The steering input of claim 2 wherein the light source has an off state in which no light is emitted from the light source, and the off state relates to a condition in which the assisted driving system is not enabled.

4. The steering input of claim 1 wherein the cover includes a first portion through which light from the light source is transmitted.

5. The steering input of claim 1 wherein a switch is received within the cavity and coupled to the cover, wherein movement of the central portion of the cover relative to the hub changes the state of the switch, and wherein the switch is coupled to a vehicle horn to provide an audible output from the horn when the switch is closed.

6. The steering input of claim 1 wherein the light source is carried by the airbag module.

7. The steering input of claim 1 wherein the living hinge is aligned with the seam and when the airbag is deployed, the airbag separates the seam and thereby separates one portion of the cover from the central portion of the cover.

8. The steering input of claim 1 wherein a mount is provided within the hub and wherein the airbag module that includes the cover is connected to the mount within the hub.

9. A vehicle, comprising:
a steering column;
a steering input having a body with a hub connected to the steering column, a spoke extending radially from the hub, and a rim coupled to the spoke, wherein the hub includes a cavity and a cover received over the cavity;
a light source arranged to emit light through a portion of the cover, the light source having a first output and a second output and being selectively driven to provide either the first output or the second output;
an airbag module received within the cavity, the cover is part of the airbag module, the cover includes a central portion defined at least in part by a seam of the cover that is located inward of a periphery of the cover and is constructed to separate upon deployment of an airbag of the airbag module such that the airbag extends through the cover when the airbag deploys, and the light source is received in the cavity on a rear side of the central portion, and the cover includes a fixed portion that is located outward of the seam and part of which is connected to the central portion by a living hinge portion of the cover and which overlaps the airbag and which does not separate upon deployment of the airbag, and wherein wires via which electricity is provided to the light source are arranged across the fixed portion; and
a vehicle control system having an assisted driving system that is operable to control movement of the steering input to control steering of the vehicle, wherein the vehicle control system is coupled to the light source to control operation of the light source, wherein the light source provides the first output when the assisted driving system is in a first state and the light source provides the second output when the assisted driving system is in a second state.

10. The vehicle of claim 9 wherein the first state is a state in which the assisted driving system is enabled and is actively controlling the vehicle steering, and the second state is a state in which the assisted driving system is enabled but is not actively controlling the vehicle steering.

11. The vehicle of claim 9 wherein the light source is coupled by one or more wires to the vehicle control system, and the one or more wires extend into the cavity through the hub.

12. The vehicle of claim 11 wherein the one or more wires extend within the steering column.

13. The vehicle of claim 9 wherein at least part of the central portion of the cover is movable relative to the hub, and wherein movement of said at least part of the central portion of the cover closes a switch contained within the cavity, and wherein the switch is coupled to a vehicle horn to provide an audible output from the horn when the switch is closed.

14. The vehicle of claim 9 wherein the first output is light of a first color and the second output is light of a second color that is different from the first color.

15. The vehicle of claim 14 wherein the light source has an off state in which no light is emitted from the light source.

16. The vehicle of claim 9 wherein the light source has a third output that is different from both the first output and the second output.

17. The vehicle of claim 9 wherein a portion of the cover includes a light transmissive portion through which light emitted from the light source is visible.

18. The vehicle of claim 17 wherein the light transmissive section is in the form of a logo of the brand of the vehicle, wherein the appearance of the logo changes when the light source is emitting light.

19. The vehicle of claim 9 wherein the living hinge is aligned with the seam and the seam is inward of a perimeter of the cover and the airbag, when deployed, separates the material of the cover along the seam and the airbag extends outwardly through the seam.

20. The vehicle of claim 9 wherein a mounting bracket is provided within the hub and wherein the airbag module that includes the cover is connected to the mounting bracket within the hub.

* * * * *